(12) United States Patent
Eldar

(10) Patent No.: US 10,061,730 B2
(45) Date of Patent: *Aug. 28, 2018

(54) ROUTING OF MESSAGES

(71) Applicant: Intel Corporation, Santa Clara, CA (US)

(72) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,274

(22) Filed: Dec. 5, 2016

(65) Prior Publication Data

US 2017/0206179 A1   Jul. 20, 2017

Related U.S. Application Data

(63) Continuation of application No. 14/152,407, filed on Jan. 10, 2014, now Pat. No. 9,514,077, which is a continuation of application No. 11/021,568, filed on Dec. 22, 2004, now Pat. No. 8,645,578.

(51) Int. Cl.
*G06F 15/173* (2006.01)
*G06F 13/38* (2006.01)
*H04L 29/06* (2006.01)

(52) U.S. Cl.
CPC ........ *G06F 13/385* (2013.01); *H04L 63/0236* (2013.01)

(58) Field of Classification Search
CPC ........................... G06F 13/385; H04L 63/0236
See application file for complete search history.

(56) References Cited

U.S. PATENT DOCUMENTS

| | | | |
|---|---|---|---|
| 6,112,311 A | * | 8/2000 | Beardsley ........... G06F 11/2005 710/8 |
| 6,226,297 B1 | * | 5/2001 | Alexander .............. H04L 45/00 370/216 |
| 6,446,192 B1 | | 9/2002 | Narasimhan et al. |
| 6,487,619 B1 | | 11/2002 | Takagi |
| 6,601,101 B1 | | 7/2003 | Lee et al. |
| 6,757,725 B1 | | 6/2004 | Frantz et al. |
| 6,826,613 B1 | | 11/2004 | Wang et al. |
| 6,941,386 B2 | | 9/2005 | Craft et al. |
| 6,996,621 B1 | | 2/2006 | Borella et al. |
| 7,316,014 B2 | | 1/2008 | Cao |

(Continued)

FOREIGN PATENT DOCUMENTS

WO   2006069279   6/2006
WO   WO-2006069279 A2   6/2006

OTHER PUBLICATIONS

"Taiwanese Application Serial No. 94145536, Response filed Nov. 9, 2009 to Examiners discussion on Oct. 19, 2009", 3 pgs.

(Continued)

*Primary Examiner* — Scott B Christensen
(74) *Attorney, Agent, or Firm* — Christopher K. Gagne

(57) ABSTRACT

A method to provide transfer of data without the use of a network from an application program to an embedded device. A routing service establishes a communication channel without the use of a local area network. The routing service then manages the control of this communication channel for the transfer of data and closes the channel in an appropriate period.

21 Claims, 6 Drawing Sheets

(56) References Cited

U.S. PATENT DOCUMENTS

| | | |
|---|---|---|
| 7,328,284 B2 | 2/2008 | Rimmer |
| 7,337,241 B2 | 2/2008 | Boucher et al. |
| 8,645,578 B2 | 2/2014 | Eldar |
| 9,514,077 B2 | 12/2016 | Eldar |
| 2003/0185220 A1 | 10/2003 | Valenci |
| 2004/0078462 A1 | 4/2004 | Philbrick et al. |
| 2006/0075119 A1 | 4/2006 | Hussain et al. |
| 2006/0133370 A1* | 6/2006 | Eldar .................. H04L 63/0236 370/389 |
| 2014/0304426 A1 | 10/2014 | Eldar |

OTHER PUBLICATIONS

"U.S. Appl. No. 11/021,568, Advisory Action dated Apr. 14, 2009", 3 pgs.
"U.S. Appl. No. 11/021,568, Appeal Brief filed Aug. 17, 2009", 25 pgs.
"U.S. Appl. No. 11/021,568, Appeal Decision datesd Nov. 1, 2012", 8 pgs
"U.S. Appl. No. 11/021,568, Decision on Pre-Appeal Brief dated Jul. 15, 2009", 2 pgs.
"U.S. Appl. No. 11/021,568, Examiner's Answer to Appeal Brief dated Dec. 3, 2009", 29 pgs.
"U.S. Appl. No. 11/021,568, Final office Action dated Feb. 3, 2009", 23 pgs.
"U.S. Appl. No. 11/021,568, Non-Final Office Action dated Jul. 8, 2008", OARN, 20 pgs.
"U.S. Appl. No. 11/021,568, Notice of Allowance dated Jun. 14, 2013", 19 pgs.
"U.S. Appl. No. 11/021,568, Notice of Allowance dated Sep. 23, 2013", 6 pgs.
"U.S. Appl. No. 11/021,568, Notice of Non-Compliant Appeal Brief dated Sep. 11, 2009", 2 pgs.
"U.S. Appl. No. 11/021,568, Pre-Appeal Brief Request filed May 4, 2009", 4 pgs.
"U.S. Appl. No. 11/021,568, Preliminary Amendment dated Nov. 1, 2006", 7 pgs.
"U.S. Appl. No. 11/021,568, Reply Brief filed Feb. 3, 2010 to Examiner's Answer dated Dec. 3, 2009", 5 pgs.
"U.S. Appl. No. 11/021,568, Reply filed Oct. 9, 2009 to Notice of Non-Compliant Appeal Brief dated Sep. 11, 2009", 3 pgs.
"U.S. Appl. No. 11/021,568, Response filed Apr. 3, 2009 to Final Office Action dated Feb. 3, 2009", 12 pgs.
"U.S. Appl. No. 11/021,568, Response filed Nov. 10, 2008 to Non Final Office Action dated Jul. 8, 2008", 12 pgs.
"U.S. Appl. No. 14/152,407, Non Final Office Action dated Apr. 8, 2016", 6 pgs.
"U.S. Appl. No. 14/152,407, Notice of Allowance dated Jul. 29, 2016", 10 pgs.
"U.S. Appl. No. 14/152,407, Preliminary Amendment filed Jul. 24, 2014", 6 pgs.
"U.S. Appl. No. 14/152,407, Response filed Jun. 29, 2016 to Non Final Office Action dated Apr. 8, 2916", 6 pgs.
"German Application Serial No. 112005003217.5, Office Action dated Jun. 12, 2008", w/English Translation, 4 pgs.
"German Application Serial No. 112005003217.5, Office Action dated Oct. 1, 2007", w/English Translation, 12 pgs.
"German Application Serial No. 112005003217.5, Response filed Jan. 13, 2009 to Office Action dated Jun. 12, 2008", w/English Translation, 26 pgs.
"German Application Serial No. 112005003217.5, Response filed May 23, 2008 to Office Action dated Oct. 1, 2007", w/English Translation, 23 pgs.
"International Application Serial No. PCT/US2005/046694, International Preliminary Report on Patentability dated Jul. 5, 2007", 7 pgs.
"International Application Serial No. PCT/US2005/046694, International Search Report and Written Opinion dated Jun. 1, 2006", 11 pgs.
"Taiwanese Application Serial No. 94145536, Office Action dated Feb. 26, 2009", w/English Translation, 19 pgs.
"Taiwanese Application Serial No. 94145536, Response filed Jun. 15, 2009 to Office Action dated Feb. 26, 2009", w/English Translation, 11 pgs.
Valero, M., et al., "Embedded Computing: New Directions in Architecture and Automation", Lecture Notes in Computer Science, vol. 1970/2000—7th International Conference, High Performance Computing (HiPC, 2000), (2000), 225-224.

* cited by examiner

ROUTING OF MESSAGES

RELATED APPLICATIONS

This application is a continuation of U.S. application Ser. No. 14/152,407, filed Jan. 10, 2014, which is a continuation of U.S. patent application Ser. No. 11/021,568, filed Dec. 22, 2004, now issued as U.S. Pat. No. 8,645,578, the entire contents of which are incorporated by reference herein in their entirety.

TECHNICAL FIELD

In general, the present subject pertains to communication systems and more particularly to application software control of an embedded unit.

BACKGROUND

Typically, third-party application software communicates through a local area network to an embedded processor for managing an embedded device controlled by the embedded processor. This application software will communicate through the local area network, utilizing standard protocol such as: HTTP (hyper text transport protocol), SOAP (standard protocol enabling remote procedure calls) messages, and TLS/SSL (transport layer security/secure socket layer).

Further, some of the services provided by application software may execute on the same computational platform for which manageability of the embedded device is sought. For example, a management console may gather inventory information from all computational platforms in an organization. This inventory information may be gathered from the embedded manageability devices residing on an organization's computational platforms. As an additional example, the information may be located in some type of non-volatile memory. The application software may need to gather such information located within the control of the embedded device to provide, for example, information sharing between local and remote agents.

Simply returning information to the application software through a local device using normal network stacks will result in the information being forwarded incorrectly. Either the TCP/IP (transmission control protocol/internet protocol) stack may not forward the information to a network adapter or the network will not return data packets back on the same physical link from which they came.

DETAILED DESCRIPTION

Figure 1:
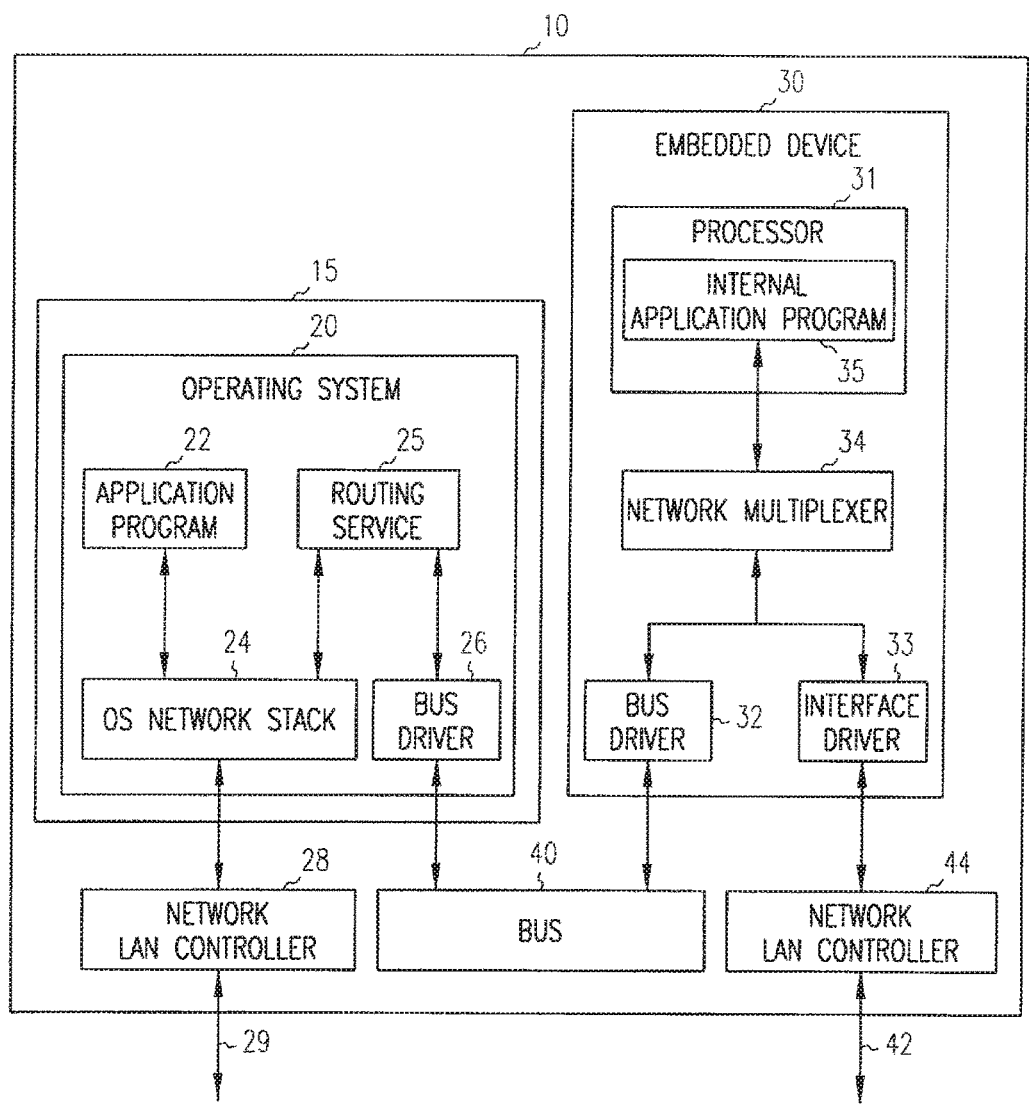
FIG. 1 is a block diagram of a communication arrangement in accordance with an embodiment in the present invention.

FIG. 1 is a block diagram of a communication arrangement directly between operating system 20 of processor 15 and embedded device 30 without using a local area network in accordance with an embodiment of the present invention. This communication arrangement can enable an application program 22 to provide out-of-band (OOB) management of the communication arrangement. OOB indicates that a system may be an operating system agnostic. Typically, application programs communicate through a network utilizing standard protocols. As an example of such an arrangement, consider a management console of computational platform 10 gathering inventory information from various computational platforms in an organization. This information may need to be gathered from embedded manageability devices (commonly referred to as embedded devices). However, simply sending the information to the embedded device through a normal network stack will result in information being incorrectly forwarded.

Operating system 20 may be associated with the application program 22. Application program 22 is coupled to the operating system (OS) network stack 24. Although application program 22 is shown within the OS 20, program 22 may be separate from the OS 20. Typical flow of messages through operating system 20 is from OS network stack 24 to network LAN controller 28 and via routing 29 to a local area network (not shown).

Incoming messages for embedded device 30 are received from the local area network (not shown) through routing 42 to a network LAN controller 44. Upon the initialization of operating system 20, routing service 25 is bound to OS network stack 24 via a particular destination port.

When application program 22 uses the particular destination port number, which is an internet assigned number authority (IANA) transmission control protocol/internet protocol (TCP/IP) port number, routing service 25 binds to this particular port number. Once this binding is completed, any messages sent to the OS network stack 24 with destination IP address assigned to OS 20 and with the particular destination port number would be routed by OS network stack 24 to routing service 25.

When application program 22 communicates with an embedded device 30, it sends a message using standard network protocols to OS network stack 24. OS network stack 24 may check the destination IP address and TCP destination port associated with the message. OS network stack 24 then identifies the message as either one which should be routed to an entity or one which should be routed to the routing service 25.

An embedded device in some embodiments may be a device that is placed within a computational platform. The embedded device may include a set of resources independent of the main resources of the computational platform, such as, a processor and a memory resources, for example.

Normally messages would be transmitted from OS network stack 24 through network LAN controller 28 and routed via network routing 29 to the network.

In the present example, OS network stack 24 has determined from the destination IP address and the TCP destination port that routing of the message should be to routing service 25, for example.

Routing service 25 may then send a connect message through bus driver 26 through bus 40 to the embedded device 30. Bus arrangement 40 may include a serial bus, a parallel bus, a PCI bus, a buffer, a switch, a memory of various types, or a number of registers.

Bus 40 then passes the message through interface driver 32 of embedded device 30 through network multiplex 34 to internal application program 35 of embedded device 30. If the message is a connect message, for example, the connect request may be successful.

Once this communication channel becomes established from routing service 25 to internal application program 35, the message originally sent by application program 22 through OS network stack 24 to routing service 25 is transmitted along the same communication channel as previously mentioned to internal application program 35. This communication channel is from routing service 25, through bus driver 26, through bus 40, through interface driver 32, through network multiplexer 34 to internal application program 35.

When all the messages have been sent by routing service 25, or received by routing service 25, routing service 25 will then close one side of the communication channel that was previously established after receiving a close request from application program 35, for example. That is, routing service 25 will tear down the connection between bus driver 26 and bus 40, and between bus 40 and interface driver 32.

In addition, embedded device 30 may receive input from the network via routing 42 through local area network (LAN) controller 44. Such network routed messages are then sent to interface driver 33, through network multiplexer 34 to the internal application program 35. Further, embedded device 30 may include an embedded processor 31 or other devices. The embedded device may provide for execution of the internal application program 35. Embedded processor 31 may be implemented on a chip-set, in an embodiment. In other embodiment, embedded processor 31 as well as embedded device 30 may be implemented as part of a chip set, on a mother board as a chip, or on a portion of a network interface card (NIC) inserted into a circuit card slot. However, the implementation is not limited to these configurations. A chip is a semiconductor device.

Bus 40 transmits messages between routing service 25 and internal application program 35 and may be implemented on top of a peripheral controller interface such as PCI/PCI-X/PCI-Express, USB, etc. type bus arrangement. Further, store and forward devices such as memories, etc. may provide the communication channel as well.

Operating system 20 may be implemented on a semiconductor device fabricated by various technologies known to those of ordinary skill in the art such as silicon, gallium arsenate, etc. This semiconductor device or "chip" may include a processor 15 having an operating system 20, an application program 22, OS network stack 24, routing service 25 and bus driver 26.

Figure 2:
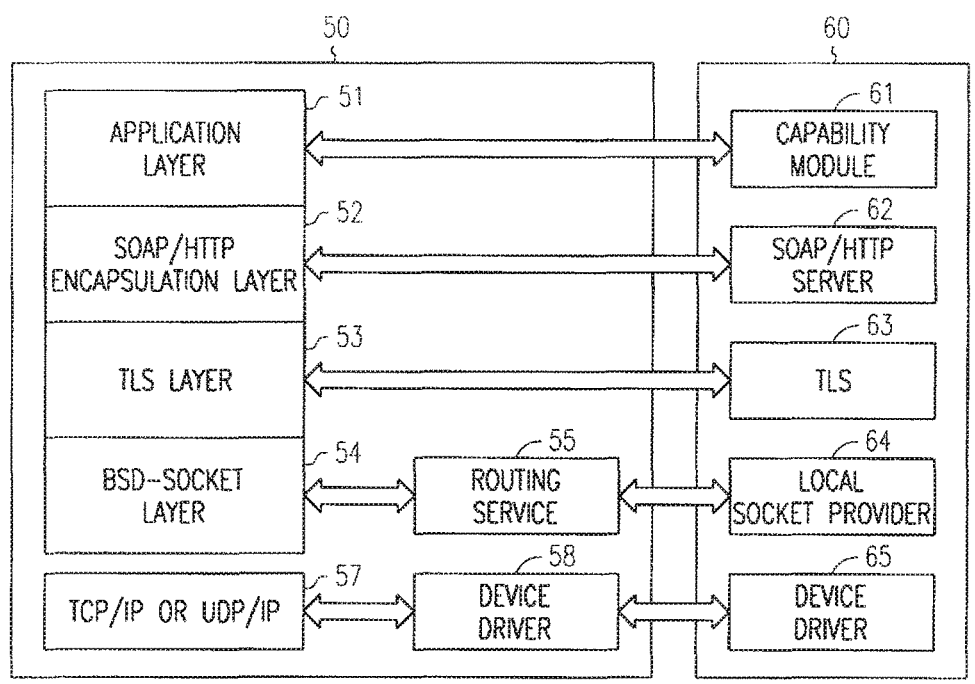
FIG. 2 is a block diagram depicting various protocol layers associated with an embodiment of the present invention.

FIG. 2 is a block diagram which maps various network protocol layers which may be used to communicate with software which handles each layer. The various protocols of 50 correspond to the protocol layers associated with operating system 20. The various protocols of 61 correspond to the protocols associated with embedded device 30. The highest level protocol within writing system protocols is the application layer 51. On the highest level of protocol stack 60 of the embedded device 30 is capability module (CM) 61 which provides the highest level protocol layer. The application layer communicates and corresponds with the capability module level 61 in the embedded device protocol stack 60.

The next lower layer within the protocol stack 50 of operating system 20 is SOAP/HTTP encapsulation layer 52. This layer corresponds and communicates with SOAP/HTTP server 62 in the embedded device protocol stack 60.

The next lower layer in the operating system stack 50 is the transport layer security (TLS) layer 53. The transport layer security 53 communicates with and corresponds to transport layer security (TLS) 63 within the embedded device protocol stack 60.

The next lower layer of the protocol stack 50 of the operating system is a BSD socket layer 54. The BSD socket layer 54 communicates with and corresponds to local socket provider 64 through routing service protocol 55. Routing service protocol 55 communicates with BSD socket layer 54. Routing service protocol 55 communicates with the local socket provider protocol 64 of the embedded device protocol stack 60.

Lastly is shown the transmission control protocol/internet protocol (TCP/IP) or user datagram protocol/internet protocol 57. Device driver protocol 58 communicates between device driver 65 of the protocol stack 60 of embedded device 30 and routing service protocol 55.

As a result of the above-described processing by routing service 25, it can be seen that a data transfer is shown excluding the use of a local area network.

Figure 3:
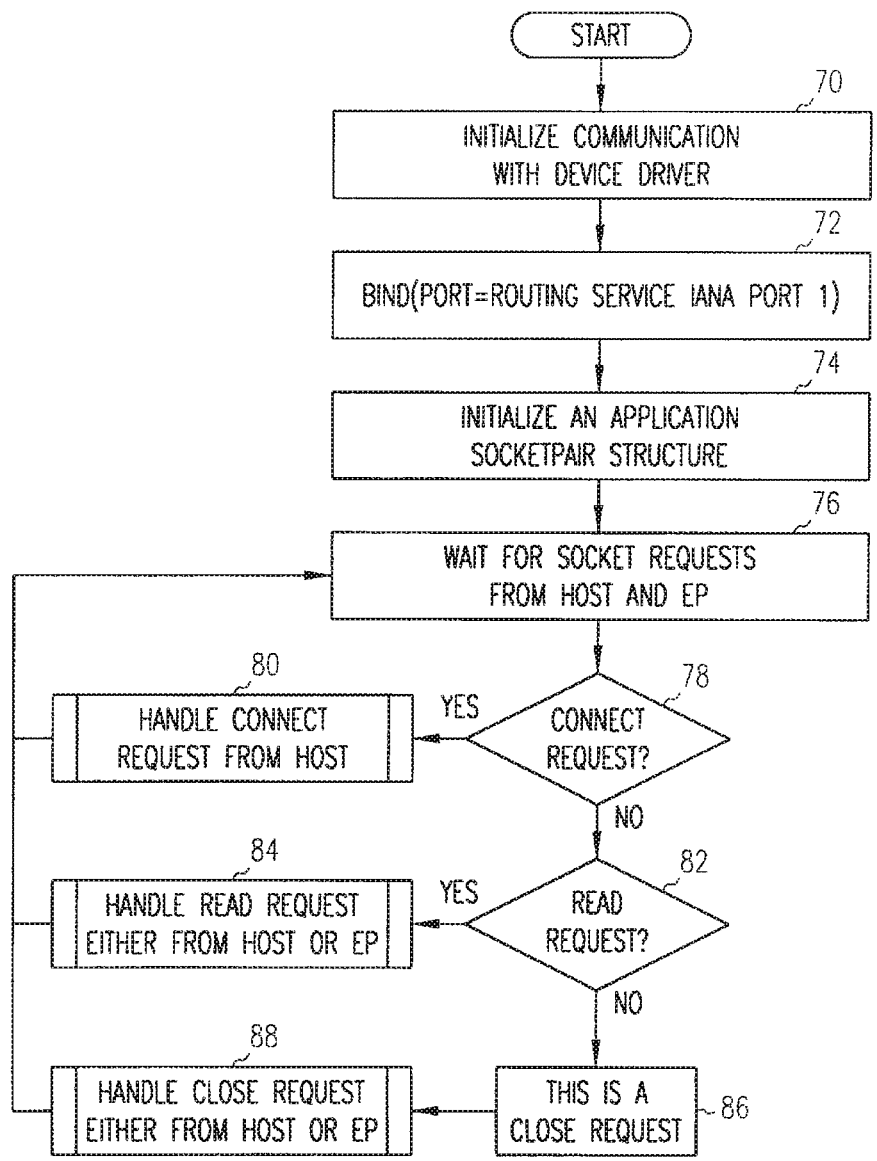
FIG. 3 is a flow chart of a communication arrangement in accordance with an embodiment of the present invention.

In FIG. 3, a flow chart of an embodiment of the method for routing is shown. This method is performed by routing service 25. The implementation for the processing described herein may take the form of machine-readable software code. This machine-readable software code might be implemented in read-only memory, any non-volatile random access memory, flash memory, electronically programmable read-only memory, etc.

The method for routing of data is started and block 70 is entered. First, the routing service 25 initializes communication with device or bus driver 26, block 70. Next, routing service 25 binds to the port associated with the TCP destination, block 72. The routing service 25 is typically bound to a particular designated TCP port when the computational platform 10 is initially started or is restarted. This IANA port couples OS network stack 24 to routing service 25.

Next, routing service 25 initializes an application socket pair, block 74. That is, routing service 25 establishes the BSD socket layer from 54 to 55 and a pseudo-socket from 55 to 64. Then routing service 25 awaits the socket requests coming from the socket layer 54 of operating system 20 and the local socket provider 64 of embedded device 30.

When these socket requests are received by routing service 25, the appropriate connection between bus drivers 26 and 32 have been selected and established.

The service 55 then waits for responses from the socket requests at block 76. When a single socket request has been received, block 76 transfers control to block 78. Block 78 determines whether the request may be a connect request to establish the communication channel from routing service 25 through bus driver 26 through bus arrangement 40, through bus driver 32 and network multiplexer 34 to internal application program 35. If the request is a connect request, block 78 transfers control to block 80 via the YES path. Block 80, which will be explained in detail later, handles the connect request from routing service 25 and host processor 15 and then transfers control, upon completion, to block 76 to wait for subsequent socket requests.

If the request is not a connect request, block 78 transfers control to block 82 via the NO path. Block 82 determines whether the request may be a read request for exchanging data between internal application program 35 and routing service 25. If the request is a read request, block 82 transfers control to block 84 via the YES path. Block 84 handles the read request from either the application program 22 of the operating system (HOST) or the internal application program 35 of the imbedded device (EP). When the read request is completed, block 84 transfers control to block 76 to wait for socket requests.

If the request is determined to be neither a connect or read request, block 82 transfers control to block 86 via the NO path. This method determines that the request should be a close request. That is, the close request is the command to tear down the previously established communication channel from routing service 25 to internal application program 35 or communication channel from application program 22 to routing service 25, depending on the source of this request (HOST or EP). Since this is a close request, block 86 transfers control to block 88. Block 88 handles the close request from either the routing service of the operating system or the internal application program of the imbedded device. Upon completion of the close, block 88 transfers control to block 76 to wait for socket requests. As a result of the above-described processing, it can be seen that a data transfer is shown excluding the use of a local area network.

Figure 4:
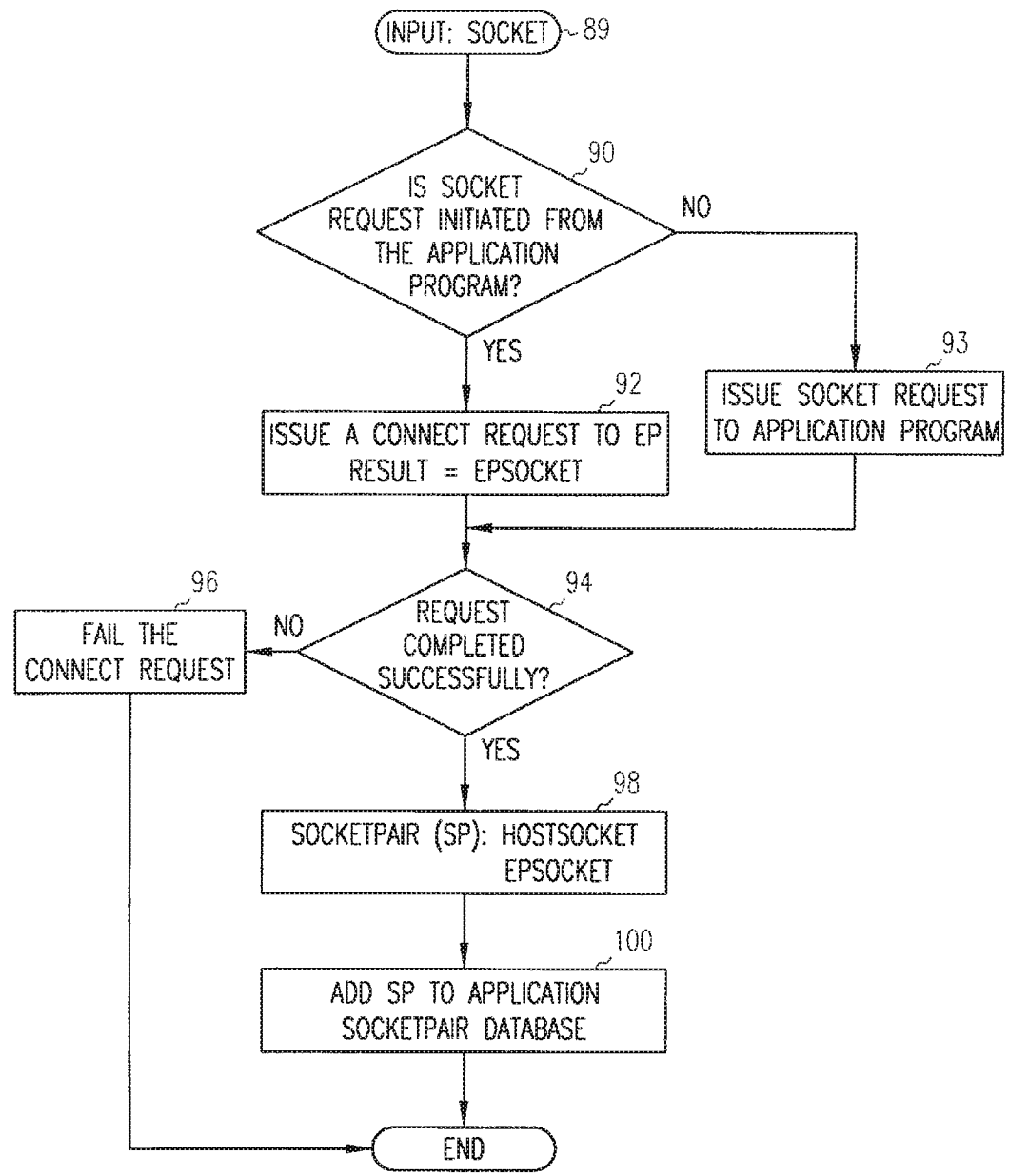
FIG. 4 is a flow chart of a connect request in accordance with an embodiment of the present invention.

In FIG. 4, a flow chart of an embodiment of the connect request processing of block 80 is shown. Block 89 diagrammatically depicts the input to the connect request 80 as being the socket identity. Block 90 then determines the socket request is initiated from the application 22. Recall that the application program 22 is typically the one which can request the connection of the communication channel between the operating system and the embedded device, although the embedded 30 may also request. If the socket request is not initiated from the application 22, block 90 transfers control via the NO path to block 93. Block 93 issues a socket request to the application. Then block 93 transfers control to block 94.

If the connect request is from the application 22, block 90 transfers control to block 92 via the YES path. Next, block 92 issues a connect request to the embedded device, resulting in embedded processor socket.

Next, block 94 waits and determines whether the connect request has been successfully completed. If the request does not complete within a predetermined time limit or is returned as being incomplete, block 94 transfers control to block 96. Block 96 indicates a failure of the connect request and ends the process.

When the connect request is successfully complete, block 94 transfers control to block 98 via the YES path. Then a socket pair (SP) is determined: HOST processor 15 and embedded processor 31. Then the socket pair for the application program 22 to internal application 35 connection is stored in a data base by routing service 25. The process is ended.

Figure 5:
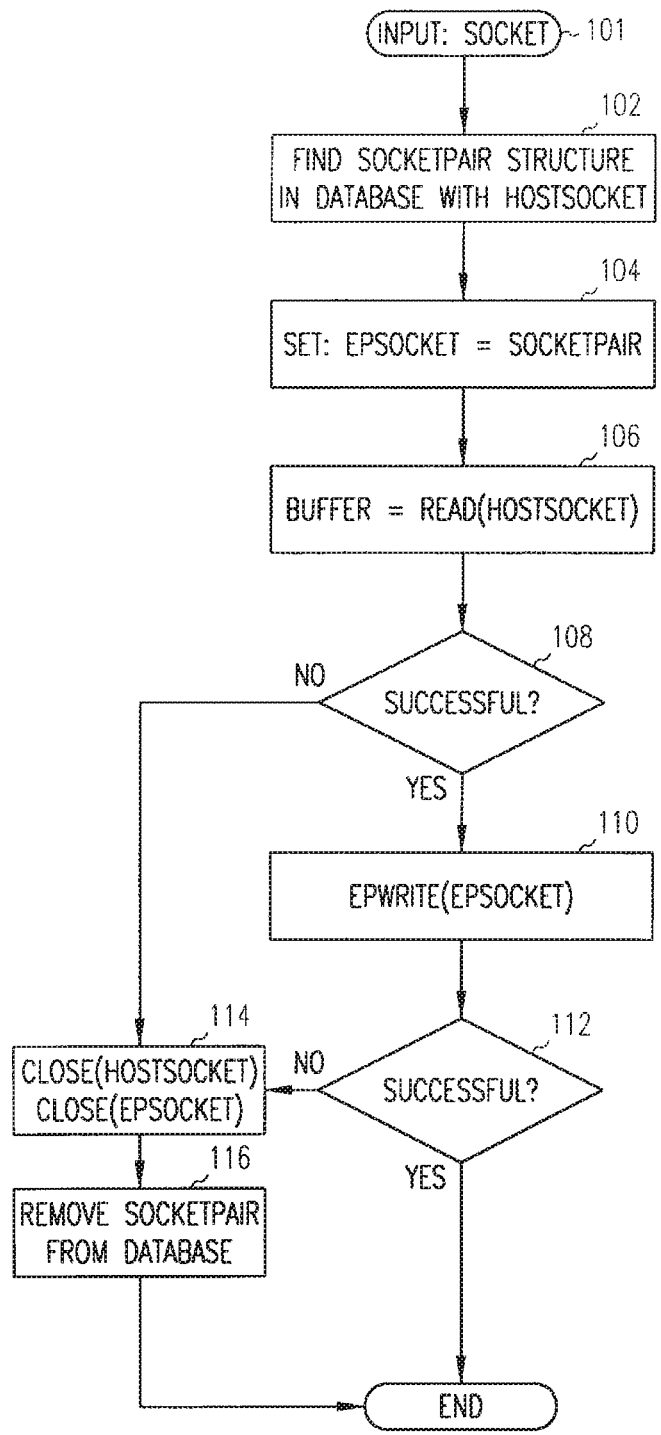
FIG. 5 is a flow chart of a read request in accordance with an embodiment of the present invention.

In FIG. 5, an embodiment of the read request 84 from either the operating system or embedded device is depicted in flow chart form. The input to the read request is the socket identity, block 101.

First, the socket pair structure is found from a data base indicating the host socket, block 102. Next, routing service 25 sets the socket of the embedded device (EP) with the socket pair of the data base, block 104.

Next, block 106 sets a read/write buffer to read from the HOST socket. This assumes that the message is being transferred from the application program 22 to the internal application program 35. If the data transfer happened to be from internal application program 35 to application program 22, the buffer read would be from the embedded device 30.

Next, block 108 determines whether this request to read into the buffer was successful. If the buffer request was successful, block 108 transfers control to block 110 via the YES path. Block 110 then writes the data. This corresponds to sending the data from the buffer through bus driver 26, through bus arrangement 40, through bus driver 32 and network multiplexer 34 to the internal application program 35 (EP). If the data transfer is from internal application program 35 to application program 22, the data flow and reading and writing would be performed by the other socket of the socket pair (HOST). If the write is successful, the data is received by internal application program 35, block 112 transfers control and ends the process.

If the attempted write was unsuccessful, block 112 transfers control to block 114 via the NO path. Block 114 first closes the operating system socket, the initiator of the data request. Then block 114 closes the embedded device socket, the receiver of the data transfer request.

Then the socket pair is removed from the data base, block 116. The process is then ended.

Similarly, for an unsuccessful read to the buffer, block 108 transfers control to block 114. Block 114 and block 116 perform as mentioned above. Then the process is ended.

Figure 6:
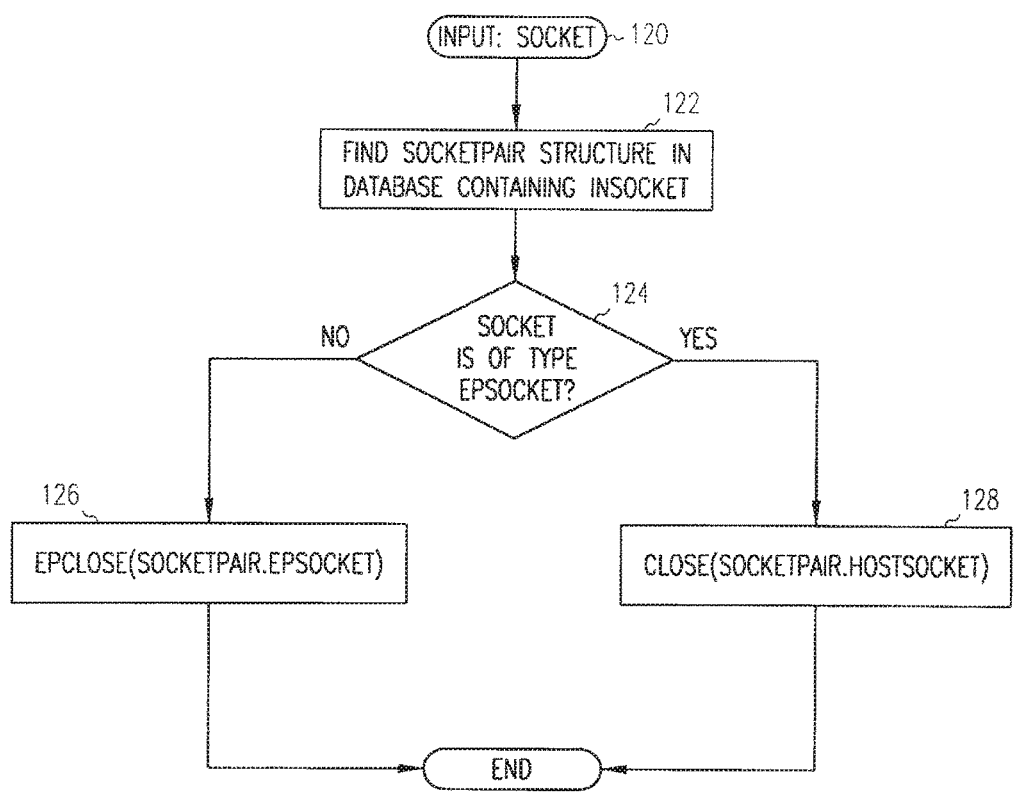
FIG. 6 is a flow chart of a close request in accordance with an embodiment of the present invention.

In FIG. 6, an embodiment of the close request 88 is depicted in flow chart form. Block 120 indicates the input being the socket identity. Next, the socket pair structure is found in the data base from the socket identity, block 122. Next, block 124 determines whether the socket identity is a type of embedded device socket (EP). If it is an embedded device, block 124 transfers control to block 128 via the YES path. Block 128 closes the socket pair from the HOST socket. Then the process is ended.

If the socket type is not an embedded device socket, block 124 transfers control to block 126 via the NO path. In block 126, the embedded device closes the socket pair from the embedded device socket (EP). Then the process is ended.

The description and the drawings illustrate specific embodiments of the invention sufficiently to enable those skilled in the art to practice it. Examples merely typify possible variations. Portions and features of some embodiments may be included in or substituted for those of others. The scope of the embodiments of the invention encompasses the full ambit of the claims and all available equivalents. In some embodiments, the present invention relates to communicating by an application program with an embedded device or processor. In other embodiments, the present invention may pertain to communication between an application program 22 and an embedded device 30 without the use of any local area network 28-29, 42-44.

As a result of the above-described processing by routing service 25, it can be seen that a data transfer is shown excluding the use of a local area network. Further, routing service 25 may be implemented on a semiconductor device. This avoids further costs of "add-on" hardware.

Although some embodiments of the invention have been illustrated, and those forms described in detail, it will be readily apparent to those skilled in the art that various modifications may be made therein without departing from the spirit of these embodiments or from the scope of the appended claims.

What is claimed is:

1. An apparatus for use in performing computationally-related operations, the apparatus comprising:
  a plurality of processors, the plurality of processors comprising semiconductor devices, the plurality of processors comprising:
    an operating system-related processor for use in association with an operating system and operating system-related operations; and an embedded processor for use in association with an embedded processor application program and the computationally-related operations;

a Peripheral Component Interconnect (PCI)-Express communication bus configured to establish a direct communication channel between the operating system-related processor and the embedded processor;

wherein:
(1) the operating system-related processor and the embedded processor are configured to carry out respective communications via a bidirectional network, the bidirectional network being configured to access certain destinations external to the apparatus;
(2) after the direct communication channel has been established between the operating system-related processor and the embedded processor via the PCI-Express communication bus, and the direct communication channel via the PCI-Express communication bus is capable of being closed responsive to a request, while the respective communications are permitted via the bidirectional network;
(3) the respective communications via the bidirectional network are to be carried out independently of other communications that are to be carried out via the direct communication channel;
(4) the operating system-related processor and the embedded processor are configured as different respective destinations accessible via the bidirectional network; and
(5) the apparatus comprises resources for independent use by the embedded processor.

2. The apparatus of claim 1, wherein:
the resources comprise memory resources.

3. The apparatus of claim 2, wherein:
the apparatus comprises an embedded semiconductor device for use in manageability-related operations.

4. The apparatus of claim 3, wherein:
the apparatus comprises network controllers for being interfaced to one or more networks.

5. The apparatus of claim 4, wherein:
the network controllers comprise local area network controllers; and
the one or more networks comprise one or more local area networks.

6. The apparatus of claim 5, wherein:
the operating system-related processor is also for use in association with an operating system-associated application program.

7. The apparatus of claim 6, wherein:
the manageability-related operations comprise out-of-band management operations.

8. At least one non-transitory machine-readable medium storing instructions that when executed by at least one machine results in the at least one machine performing operations comprising:
establishing, via a Peripheral Component Interconnect (PCI)-Express communication bus, a direct communication channel between an operating system-related processor and an embedded processor;
after the direct communication channel has been established between the operating system-related processor and the embedded processor via the PCI-Express communication bus, closing, responsive to a request, the direct communication channel, while permitting respective communications to be carried out by the operating system-related processor and the embedded processor via a bidirectional network, the bidirectional network being configured to access certain destinations;

wherein:
the certain destinations are external to an apparatus that comprises the PCI-Express communication bus, the operating system-related processor, and the embedded processor;
the apparatus is for use in performing computationally-related operations;
the apparatus comprises a plurality of processors that comprise semiconductor devices;
the plurality of processors comprise the operating system-related processor and the embedded processor;
the operating system-related processor is for use in association with an operating system and operating system-related operations;
the embedded processor is for use in association with an embedded processor application program and the computationally-related operations;
the respective communications via the bidirectional network are to be carried out independently of other communications that are to be carried out via the direct communication channel;
the operating system-related processor and the embedded processor are configured as different respective destinations accessible via the bidirectional network; and
the apparatus comprises resources for independent use by the embedded processor.

9. The at least one non-transitory machine-readable medium of claim 8, wherein:
the resources comprise memory resources.

10. The at least one non-transitory machine-readable medium of claim 9, wherein:
the apparatus comprises an embedded semiconductor device for use in manageability-related operations.

11. The at least one non-transitory machine-readable medium of claim 10, wherein:
the apparatus comprises network controllers for being interfaced to one or more networks.

12. The at least one non-transitory machine-readable medium of claim 11, wherein:
the network controllers comprise local area network controllers; and
the one or more networks comprises one or more local area networks.

13. The at least one non-transitory machine-readable medium of claim 12, wherein:
the operating system-related processor is also for use in association with an operating system-associated application program.

14. The at least one non-transitory machine-readable medium of claim 13, wherein:
the manageability-related operations comprise out-of-band management operations.

15. A method comprising:
establishing, via a Peripheral Component Interconnect (PCI)-Express communication bus, a direct communication channel between an operating system-related processor and an embedded processor;
after the direct communication channel has been established between the operating system-related processor and the embedded processor via the PCI-Express communication bus, closing, responsive to a request, the direct communication channel, while permitting respective communications to be carried out by the operating system-related processor and the embedded processor via a bidirectional network, the bidirectional network being configured to access certain destinations;

wherein:

the certain destinations are external to an apparatus that comprises the PCI-Express communication bus, the operating system-related processor, and the embedded processor;

the apparatus is for use in performing computationally-related operations;

the apparatus comprises a plurality of processors that comprise semiconductor devices;

the plurality of processors comprise the operating system-related processor and the embedded processor;

the operating system-related processor is for use in association with an operating system and operating system-related operations;

the embedded processor is for use in association with an embedded processor application program and the computationally-related operations;

the respective communications via the bidirectional network are to be carried out independently of other communications that are to be carried out via the direct communication channel;

the operating system-related processor and the embedded processor are configured as different respective destinations accessible via the bidirectional network; and the apparatus comprises resources for independent use by the embedded processor.

16. The method of claim 15, wherein:
the resources comprise memory resources.

17. The method of claim 16, wherein:
the apparatus comprises an embedded semiconductor device for use in manageability-related operations.

18. The method of claim 17, wherein:
the apparatus comprises network controllers for being interfaced to one or more networks.

19. The method of claim 18, wherein:
the network controllers comprise local area network controllers; and
the one or more networks comprises one or more local area networks.

20. The method of claim 19, wherein:
the operating system-related processor is also for use in association with an operating system-associated application program.

21. The method of claim 20, wherein:
the manageability-related operations comprise out-of-band management operations.

* * * * *